(12) United States Patent
Chen et al.

(10) Patent No.: US 11,780,158 B2
(45) Date of Patent: Oct. 10, 2023

(54) 3D PRINTING DEVICE, AND RELEASE METHOD AND LIQUID CONTAINING MECHANISM THEREFOR

(71) Applicant: ZHEJIANG XUNSHI TECHNOLOGY CO. LTD, Shaoxing (CN)

(72) Inventors: Yong Chen, Shaoxing (CN); Jing Zhang, Shaoxing (CN); Liang Jin, Shaoxing (CN); Jianhuan Xie, Shaoxing (CN); Ming Chen, Shaoxing (CN)

(73) Assignee: ZHEJIANG XUNSHI TECHNOLOGY CO. LTD, Shaoxing (CN)

( * ) Notice: Subject to any disclaimer, the term of this patent is extended or adjusted under 35 U.S.C. 154(b) by 41 days.

(21) Appl. No.: 17/268,037

(22) PCT Filed: Aug. 14, 2019

(86) PCT No.: PCT/CN2019/100567
§ 371 (c)(1),
(2) Date: Feb. 11, 2021

(87) PCT Pub. No.: WO2020/034991
PCT Pub. Date: Feb. 20, 2020

(65) Prior Publication Data
US 2021/0245427 A1    Aug. 12, 2021

(30) Foreign Application Priority Data

Aug. 14, 2018  (CN) .................... CN201810919493.7
Aug. 14, 2018  (CN) .................... CN201810919505.6

(Continued)

(51) Int. Cl.
*B29C 64/129* (2017.01)
*B29C 64/232* (2017.01)
(Continued)

(52) U.S. Cl.
CPC .......... *B29C 64/129* (2017.08); *B29C 64/232* (2017.08); *B29C 64/245* (2017.08);
(Continued)

(58) Field of Classification Search
CPC ... B29C 64/124; B29C 64/129; B29C 64/135; B29C 64/259; B29C 64/245
See application file for complete search history.

(56) References Cited

U.S. PATENT DOCUMENTS

| 9,597,731 B2 | 3/2017 | Volk |
| 2014/0085620 A1* | 3/2014 | Lobovsky .............. B33Y 10/00 355/72 |

(Continued)

FOREIGN PATENT DOCUMENTS

| CN | 203836065 U | 9/2014 |
| CN | 104210102 A | 12/2014 |

(Continued)

OTHER PUBLICATIONS

CNIPA; Application No. CN201910740656X; Decision of Rejection dated May 27, 2022.

(Continued)

*Primary Examiner* — Joseph S Del Sole
*Assistant Examiner* — Ariella Machness
(74) *Attorney, Agent, or Firm* — Fitch, Even, Tabin & Flannery, LLP

(57) ABSTRACT

The present application discloses a 3D printing device and a release method and a liquid containing mechanism therefor, and relates to the field of 3D printing. The liquid containing mechanism comprises a material box foundation, (Continued)

a material box and a plurality of motion guide components. The material box foundation is a rigid annular plate with a mounting groove and is detachably mounted on a base of the 3D printing device, the mounting groove of the material box foundation is covered by a light-transmitting glass plate, and the glass plate is fixed on an upper surface of the material box foundation. The plurality of motion guide components are fixed to a peripheral edge of the material box and then detachably fixed on the material box foundation. Each of the motion guide components is a following component with an upper limit structure and a lower limit structure, and the following component is fixed to the peripheral edge of the material box. The plurality of motion guide components are configured for enabling the material box to follow a printing mechanism for a certain distance between the upper limit structures and the lower limit structures so as to release a film. By a design of fixed glass plate and a separated and multi-section release, the liquid containing mechanism of the present application features improved printing quality, reduced cost and less likelihood of film deformation.

8 Claims, 11 Drawing Sheets

(30) Foreign Application Priority Data

| Aug. 14, 2018 | (CN) | CN201821303312.X |
| Aug. 14, 2018 | (CN) | CN201821304239.8 |
| Aug. 14, 2018 | (CN) | CN201821309304.6 |
| Aug. 12, 2019 | (CN) | CN201910740656.X |

(51) Int. Cl.
*B29C 64/245* (2017.01)
*B33Y 30/00* (2015.01)
*B33Y 40/00* (2020.01)
*B29C 64/259* (2017.01)
*B33Y 10/00* (2015.01)

(52) U.S. Cl.
CPC ............ *B29C 64/259* (2017.08); *B33Y 30/00* (2014.12); *B33Y 10/00* (2014.12); *B33Y 40/00* (2014.12)

(56) References Cited

U.S. PATENT DOCUMENTS

| 2015/0298396 A1* | 10/2015 | Chen | B29C 64/255 |
| | | | 425/110 |
| 2016/0059308 A1* | 3/2016 | Volk | B33Y 10/00 |
| | | | 428/615 |
| 2017/0080641 A1* | 3/2017 | El-Siblani | B29C 64/124 |
| 2018/0341184 A1* | 11/2018 | Hundley | B29C 35/0888 |

FOREIGN PATENT DOCUMENTS

| CN | 204431745 U | 7/2015 | |
| CN | 104999665 A | 10/2015 | |
| CN | 105365218 A | 3/2016 | |
| CN | 205097561 U | 3/2016 | |
| CN | 205685751 U | 11/2016 | |
| CN | 205836012 U | 12/2016 | |
| CN | 106426921 A | 2/2017 | |
| CN | 205685746 U | 9/2022 | |
| WO | WO-2018106472 A1 * | 6/2018 | ........... B29C 64/124 |
| WO | WO-2018160005 A1 * | 9/2018 | ........... B29C 64/124 |

OTHER PUBLICATIONS

PCT; App No. PCT/CN2019/100567; International Search Report and Written Opinion dated Oct. 29, 2019.
CNIPA; Application No. 201910740656X; Office Action dated Oct. 26, 2022.

* cited by examiner

3D PRINTING DEVICE, AND RELEASE METHOD AND LIQUID CONTAINING MECHANISM THEREFOR

CROSS-REFERENCE TO RELATED APPLICATIONS

This application is a U.S. national phase application of International Application No. PCT/CN2019/100567, filed Aug. 14, 2019, which claims priority to Chinese Application No. 201810919505.6, filed Aug. 14, 2018, Chinese Application No. 201810919493.7, filed Aug. 14, 2018, Chinese Application No. 201821309304.6, filed Aug. 14, 2018, Chinese Application No. 201821303312.X, filed Aug. 14, 2018, Chinese Application No. 201821304239.8, filed Aug. 14, 2018, and Chinese Application No. 201910740656.X, filed Aug. 12, 2019.

FIELD OF THE INVENTION

The present application relates to the technical field of 3D printing, and in particular to a 3D printing device and a release method and a liquid containing mechanism therefor.

DESCRIPTION OF THE PRIOR ART 3D printing, namely one of rapid prototyping technologies, is a technology that uses powdery metal, plastic or other bondable materials to construct an object in a layer-by-layer printing manner based on a digital model file. 3D printing is generally implemented by digital technology material printers. 3D printing is often used to manufacture models in fields like mold making and industrial design, and is gradually used in the direct manufacturing of some products. There have been parts that are printed by using this technology.

Different from both the printing of characters on the plane of paper and the conventional method for manufacturing products by milling, etc., 3D printing is a series of technologies and methods that complete the manufacturing of an article by three-dimensional layer-by-layer printing. The specific implementation method is as follows: based on a three-dimensional computer-designed model and through a software-based layered discretion and a numerically controlled prototyping system, a special material such as metal powder, ceramic powder, plastic or cell tissue is piled and bonded layer by layer by employing a laser beam, a hot melt nozzle, etc., and is finally stacked and shaped, thus producing a physical product.

Compared with conventional manufacturing methods, 3D printing has a lot of advantages, such as simplifying the technological process, manufacturing articles with complex spatial shapes and saving materials. Therefore, in recent years, the 3D printing technology has developed rapidly and has been applied in many fields, such as jewelry, footwear, industrial design, architecture, engineering and construction, automobile, aerospace, dental and medical industries, education, geographic information systems, civil engineering and guns. Articles manufactured by 3D printing have penetrated into various areas of people's lives.

3D printers that use photosensitive resin as printing material need to use a resin box to contain the photosensitive resin, for example, a 3D printer disclosed in the Chinese patent publication No. CN205685751U. As shown in FIG. 1 and FIG. 2, the 3D printer comprises a chassis 10 and a resin box 20 disposed on the chassis 10, an optical system and a light source are disposed below the resin box 20, the light emitted by the light source passes through the optical system and irradiates a bottom of the resin box 20, and a top of the resin box 20 is provided with a printing head.

The resin box 20 comprises a bottom plate 201 made of an aluminum plate and a box body 202 disposed on a top of the bottom plate 201. Four corners of a bottom of the box body 202 are provided with four nut studs, the bottom plate 201 is provided with counterbores 2011 thereon for the insertion of the nut studs, and a bottom of the bottom plate 201 is provided with bolts 203 that upwardly pass through the counterbores 2011 and are then screwed in the nut studs. Threads of the bolts 203 are connected in the nut studs, and thus the resin box 20 is fixed on the chassis 10.

Normally, a piece of transparent projection glass is placed on the resin box 20, and a printed film is placed in the box body 202.

However, in the prior art, the projection glass may not be fixed tightly and can easily lead to positional change, causing the change of distance/focal length and other problems and thus resulting in low printing precision.

In the process of printing, due to the problem of vacuum suction force, there exist technical problems like loud release sound, easy deformation of the film, short service life of the film, etc.

Moreover, since the conventional resin box is of a unitary design and poor in universality, the resin box needs to be replaced in time after being damaged, and as a result, not only is the use cost increased, but also calibration has to be performed after the damaged resin box is replaced by a new resin box, leading to problems such as time and energy consumption and high mounting and operation requirements.

Therefore, those skilled in the art devote themselves to developing a 3D printing device which can improve the quality of 3D printing, make a film less prone to deformation, reduce cost, simplify mounting operation and increase the speed of mounting calibration.

SUMMARY OF THE INVENTION

In view of the aforementioned defects of the prior art, the technical problems to be solved by the present application include at least one of the following: poor 3D printing quality, easy deformation of the film, high cost and high mounting and operation requirements.

In order to achieve the aforementioned purpose, one aspect of the present application provides a 3D printing device, which comprises a base, a printing mechanism, a liquid containing mechanism and an exposure mechanism, wherein the printing mechanism is located above the liquid containing mechanism, and the exposure mechanism is located below the liquid containing mechanism;

the liquid containing mechanism comprises a material box foundation, a material box and a plurality of motion guide components, the material box is detachably mounted on the material box foundation through the plurality of motion guide components, and the material box is spaced apart from the printing mechanism above;

the liquid containing mechanism further comprises a light-transmitting glass plate, the material box foundation is a rigid annular plate with a mounting groove and is detachably mounted on the base, the mounting groove of the material box foundation is covered by the glass plate, and the glass plate is fixed to the upper surface of the material box foundation;

the plurality of motion guide components are fixed to peripheral edge of the material box and then detachably fixed on the material box foundation, and the material box is disposed on the glass plate;

the glass plate is used for placement of a film on an upper surface thereof in the material box;

each of the motion guide components is a following component with an upper limit structure and a lower limit structure;

the printing mechanism is used for moving upward and pulling a printed object by adhesion between the film and the printed object so as to drive the material box to move together during release; and the plurality of motion guide components are used for enabling the material box to follow the printing mechanism for a certain distance between the upper limit structures and the lower limit structures to realize release of the film.

Optionally, each of the motion guide components comprises a guide rod, an upper spring, a lower spring, an upper spring adjuster and a lower spring adjuster, the upper spring adjuster is the upper limit structure, and the lower spring adjuster is the lower limit structure;

the guide rod passes through the peripheral edge of the material box and is then fixed on the material box foundation;

the upper spring wraps around the portion of the guide rod which is above the upper surface of the material box, the upper spring adjuster is adjustably fixed to the guide rod and the upper spring adjuster is located on the top of the upper spring, and the upper spring is pushed against an upper surface of the material box through the upper spring adjuster; and the lower spring wraps around the portion of the guide rod which is below a lower surface of the material box, the lower spring adjuster is adjustably fixed to the guide rod and the lower spring adjuster is located below the lower spring, and the lower spring is pushed against the lower surface of the material box through the lower spring adjuster.

Optionally, a projecting stop structure is also provided on the guide rod and above the upper spring adjuster.

Optionally, the 3D printing device further comprises an adjusting rod and an adjusting spring; an upper surface of the base is provided with a plurality of support pillars, and the material box foundation is detachably fixed on the support pillar through the adjusting rod; and the adjusting spring wraps around the adjusting rod, and two ends of the adjusting spring contact against an upper surface of the support pillar and the lower surface of the material box foundation respectively.

Optionally, a top surface of the support pillar and a bottom of the material box foundation are each provided with an adjusting hole mating with the adjusting rod, wherein the adjusting hole of the material box foundation is a through hole, an internal surface of the adjusting hole in the top surface of the support pillar is provided with a thread, and the adjusting rod is fixed in the adjusting hole of the support pillar after passing through the through hole.

Optionally, the motion guide component is a pneumatic component, a hydraulic component, or an electric component.

Another aspect of the present application provides a liquid containing mechanism in a 3D printing device, and the liquid containing mechanism is located above a base of the 3D printing device and below a printing mechanism of the 3D printing device;

the liquid containing mechanism comprises a material box foundation, a material box and a plurality of motion guide components, the material box is detachably mounted on the material box foundation through the plurality of motion guide components, and the material box is spaced apart from the printing mechanism above;

the liquid containing mechanism further comprises a light-transmitting glass plate, the material box foundation is a rigid annular plate with a mounting groove and is detachably mounted on the base, the mounting groove of the material box foundation is covered by the glass plate, and the glass plate is fixed to the upper surface of the material box foundation;

the plurality of motion guide components are fixed to peripheral edge of the material box and then detachably fixed on the material box foundation, and the material box is disposed on the glass plate;

the glass plate is used for placement of a film on an upper surface thereof in the material box;

each of the motion guide components is a following component with an upper limit structure and a lower limit structure;

the printing mechanism is used for moving upward and pulling a printed object by adhesion between the film and the printed object so as to drive the material box to move together during release; and the plurality of motion guide components are used for enabling the material box to follow the printing mechanism for a certain distance between the upper limit structures and the lower limit structures to realize release of the film.

Optionally, each of the motion guide components comprises a guide rod, an upper spring, a lower spring, an upper spring adjuster and a lower spring adjuster, the upper spring adjuster is the upper limit structure, and the lower spring adjuster is the lower limit structure;

the guide rod passes through the peripheral edge of the material box and is then fixed on the material box foundation;

the upper spring wraps around the portion of the guide rod which is above the upper surface of the material box, the upper spring adjuster is adjustably fixed to the guide rod and the upper spring adjuster is located on the top of the upper spring, and the upper spring is pushed against an upper surface of the material box through the upper spring adjuster; and the lower spring wraps around the portion of the guide rod which is below a lower surface of the material box, the lower spring adjuster is adjustably fixed to the guide rod and the lower spring adjuster is located below the lower spring, and the lower spring is pushed against the lower surface of the material box through the lower spring adjuster.

Optionally, a projecting stop structure is also provided on the guide rod and above the upper spring adjuster.

Optionally, an upper surface of the base is provided with a plurality of support pillars, and the material box foundation is detachably fixed on the support pillar through the adjusting rod of the 3D printing device; and the adjusting spring wraps around the adjusting rod, and two ends of the adjusting spring contact against an upper surface of the support pillar and the lower surface of the material box foundation respectively.

Optionally, a top surface of the support pillar and a bottom of the material box foundation are each provided with an adjusting hole mating with the adjusting rod, wherein the adjusting hole of the material box foundation is a through hole, an internal surface of the adjusting hole in the top surface of the support pillar is provided with a thread, and the adjusting rod is fixed in the adjusting hole of the support pillar after passing through the through hole.

Optionally, the motion guide component is a pneumatic component, a hydraulic component, or an electric component.

Another aspect of the present application provides a release method for a 3D printing device. The 3D printing device comprises a base, a printing mechanism, a liquid containing mechanism and an exposure mechanism, wherein the printing mechanism is located above the liquid containing mechanism, and the exposure mechanism is located below the liquid containing mechanism;

the liquid containing mechanism comprises a material box foundation, a material box and a plurality of motion guide components, the material box is detachably mounted on the material box foundation through the plurality of motion guide components, and the material box is spaced apart from the printing mechanism above;

the liquid containing mechanism further comprises a light-transmitting glass plate, the material box foundation is a rigid annular plate with a mounting groove and is detachably mounted on the base, the mounting groove of the material box foundation is covered by the glass plate, and the glass plate is fixed to the upper surface of the material box foundation;

the plurality of motion guide components are fixed to peripheral edge of the material box and then detachably fixed on the material box foundation, and the material box is disposed on the glass plate;

each of the motion guide components is a following component with an upper limit structure and a lower limit structure; and the glass plate is used for placement of a film on an upper surface thereof in the material box; and the release method comprises:

during release, the printing mechanism moving upward and pulling a printed object by adhesion between the film and the printed object so as to drive the material box to move together; and the plurality of motion guide components enabling the material box to follow the printing mechanism for a certain distance between the upper limit structures and the lower limit structures to realize release of the film.

Optionally, each of the motion guide components comprises a guide rod, an upper spring, a lower spring, an upper spring adjuster and a lower spring adjuster, the upper spring adjuster is the upper limit structure, and the lower spring adjuster is the lower limit structure;

the guide rod passes through the peripheral edge of the material box and is then fixed on the material box foundation;

the upper spring wraps around the portion of the guide rod which is above the upper surface of the material box, the upper spring adjuster is adjustably fixed to the guide rod and the upper spring adjuster is located on the top of the upper spring, and the upper spring is pushed against an upper surface of the material box through the upper spring adjuster; and the lower spring wraps around the portion of the guide rod which is below a lower surface of the material box, the lower spring adjuster is adjustably fixed to the guide rod and the lower spring adjuster is located below the lower spring, and the lower spring is pushed against the lower surface of the material box through the lower spring adjuster.

Optionally, the release method further comprises:

adding expected material into the material box, and before release, keeping the upward elastic force of the lower springs+the weight of the material box+the weight of the expected material=the downward elastic force of the upper springs, so that the film is placed on the upper surface of the glass plate in a tightly attached state and adhesion exists therebetween;

during release, when the printing mechanism moves upward to overcome the adhesion and pulls the printed object, the film and the glass plate starting to separate slowly, so that oxygen enters between the film and the glass plate, thus completing the first stage of release of the film from the glass plate, wherein at this point, adhesion exists between the film and the printed object, and the downward elastic force of the upper springs+the gravity of the material box+the gravity of the expected material<the upward elastic force of the lower springs+the upward force of the printing mechanism; and the upper springs and the lower springs driving the material box to follow the printing mechanism to move upward for a certain distance until the downward elastic force of the upper springs+the gravity of the material box+ the gravity of the expected material being>the upward elastic force of the lower springs+the upward force of the printing mechanism, so that the film and the glass plate are separated completely, thus completing the second stage of release of the film from the printed object.

Since the 3D printing device and the release method and liquid containing mechanism therefor described above adopt a separated arrangement of the material box and the material box foundation, the mounting dimensions of the designed projective plane will not be affected when the material box is replaced, the universality of the material box is ensured, and thus the manufacturing cost for replacing the material box can be reduced. By fixing the glass plate on the material box foundation, the glass plate can be always kept still in the process of printing, improving the 3D printing precision and quality of the 3D printing device. The material box is connected to the material box foundation through the motion guide components and the motion guide components enable the material box to follow the printing mechanism for a certain distance between the upper limit structures and the lower limit structures, and thus section-by-section release can be achieved, deformation of the film in the process of release is reduced, sound during release is lowered and service life of the film is prolonged.

In order to fully understand the purpose, features and effects of the present application, the concept, specific structure and technical effects produced of the present application will be further described with reference to the drawings.

DETAILED DESCRIPTION OF THE PREFERRED EMBODIMENTS

Figure 1:
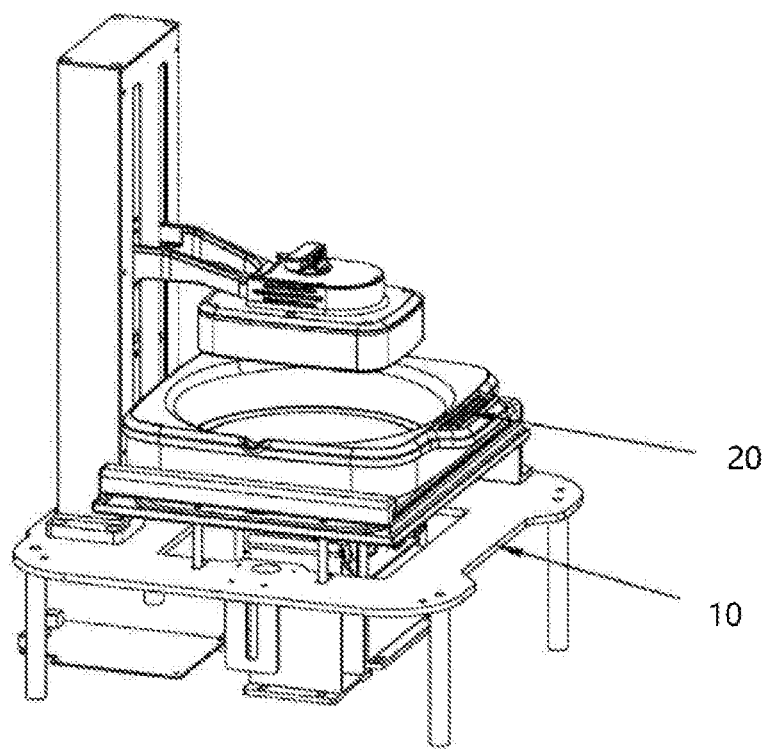
FIG. 1 is a structural schematic diagram of a 3D printer in the prior art.
Figure 2:
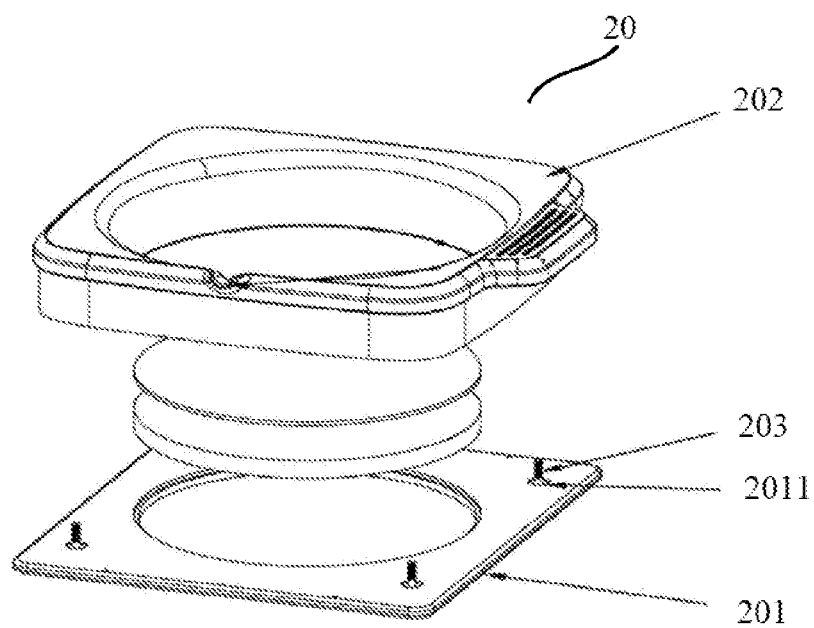
FIG. 2 is a structural schematic diagram of a resin box of the 3D printer in FIG. 1 in the prior art.

A plurality of preferred embodiments of the present application are introduced below with reference to the drawings of the specification so as to make its technical contents clearer and easier to understand. The present application can be embodied by many different forms of embodiments, and the protection scope of the present application is not limited to the embodiments mentioned herein only.

In the drawings, the components with same structure are denoted by same numerals, and assemblies with similar structure or similar function at every part are denoted by similar numerals. The size and thickness of each assembly shown in the drawings are shown arbitrarily, and the present application does not limit the size and thickness of each assembly. In order to make the illustration clearer, the thickness of components is exaggerated in some places in the drawings.

Figure 3:
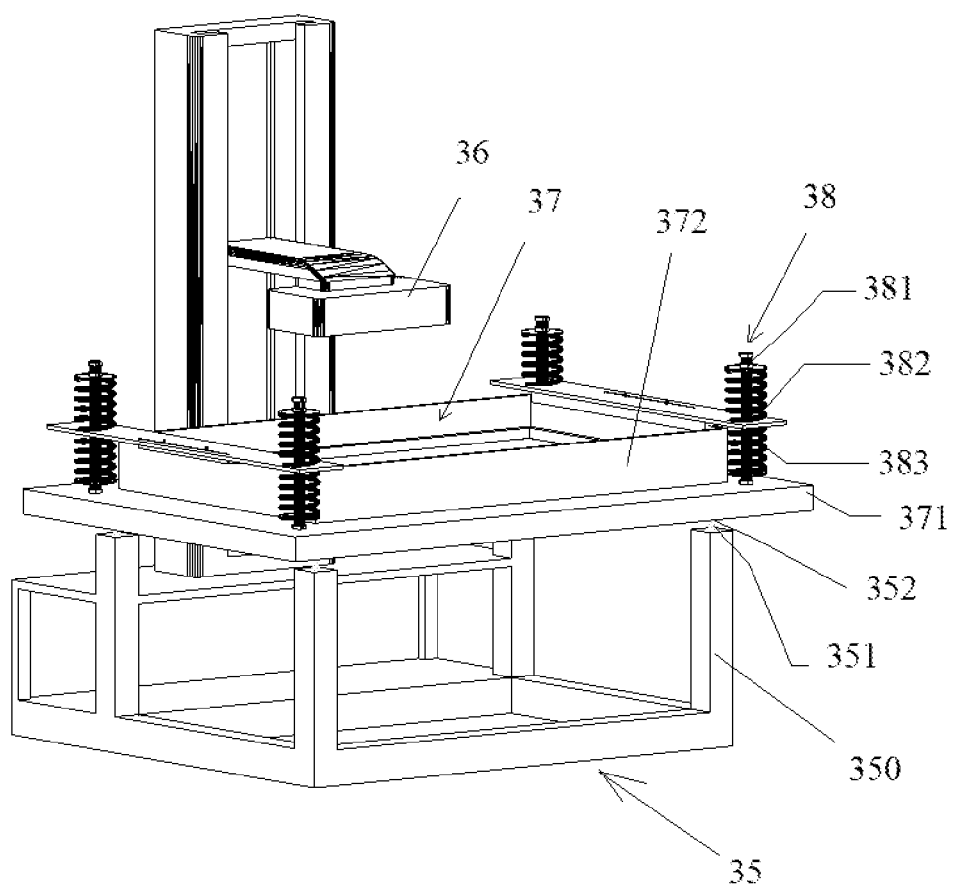
FIG. 3 is a structural schematic diagram of a 3D printing device according to one embodiment of the present application.
Figure 4:
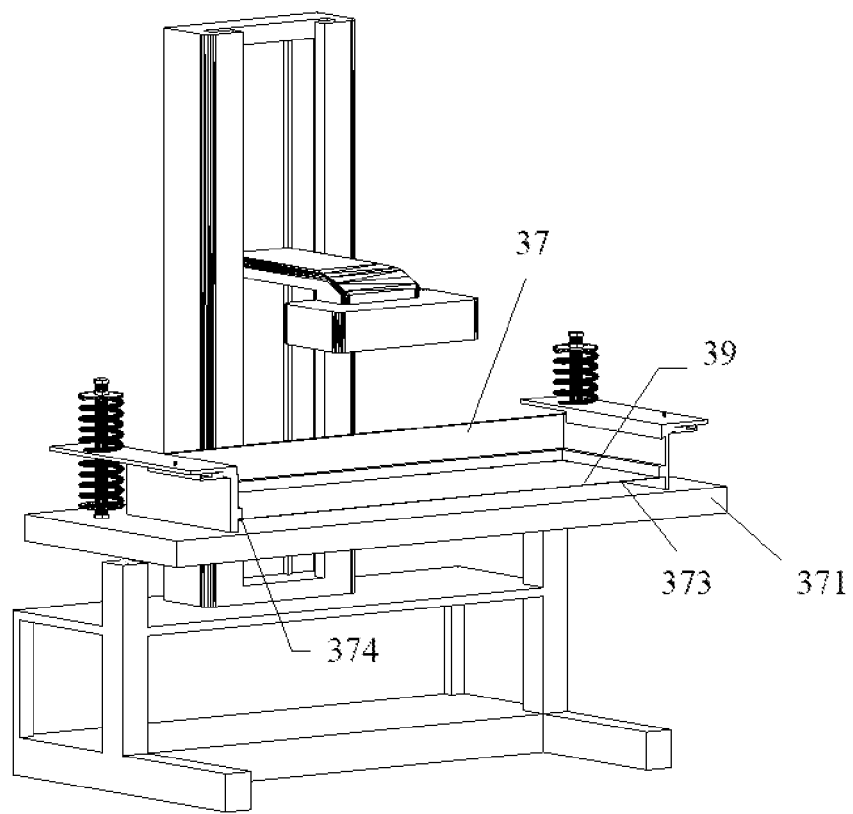
FIG. 4 is a cross-sectional schematic diagram of a liquid containing mechanism of the 3D printing device in FIG. 3.

As shown in FIGS. 3-4, a 3D printing device according to one embodiment of the present application is provided. The 3D printing device comprises a printing mechanism 36 and a liquid containing mechanism 37 mounted on a base 35, wherein the printing mechanism 36 is located above the liquid containing mechanism 37, and the liquid containing mechanism 37 is located on the base 35.

The liquid containing mechanism 37 comprises a material box foundation 371 and a material box 372. The material box 372 is a bottom-less basin, the shape of which may be round, square or rectangular and is not limited by the present application. The material box 372 may be detachably mounted on the material box foundation 371 through a plurality of motion guide components 38, and the material box 372 is spaced apart from the printing mechanism 36 above.

For example, the base 35 is provided with a plurality of upward support pillars 350, and the material box foundation 371 is detachably fixed on the support pillar 350 through an adjusting rod 351; and an adjusting spring 352 wraps around the adjusting rod 351, two ends of the adjusting spring 352 contact against an upper surface of the support pillars 350 and a lower surface of the material box foundation 371, wherein the adjusting rod 351 may be a screw or a bolt.

A top surface of the support pillar 350 and a bottom of the material box foundation 371 are each provided with an adjusting hole (not shown) mating with the adjusting rod 351, wherein the adjusting hole of the material box foundation 371 is a through hole, an internal surface of the adjusting hole in the top surface of the support pillar 350 is provided with a thread, and the adjusting rod 351 is fixed in the adjusting hole of the support pillar 350 after passing through the through hole.

The liquid containing mechanism 37 further comprises a light-transmitting glass plate, the material box foundation 371 is a rigid annular plate with a mounting groove, the mounting groove of the material box foundation 371 is covered by the glass plate, and the glass plate is fixed to an upper surface of the material box foundation 371 and the material box 372 is on the glass plate. For example, the glass plate is fixed on the upper surface of the material box foundation 371 by applying fixing glue on the perimeter of the glass plate. For example, the fixing glue may be AB glue. The size and shape of the glass plate may be determined according to the size and shape of the material box 372.

The plurality of motion guide components 38 are fixed to peripheral edge of the material box 372 and then detachably fixed on the material box foundation 371. For example, each of the motion guide components 38 is a following component with an upper limit structure and, optionally, a lower limit structure, and the following component is fixed to the peripheral edge of the material box 372.

The printing mechanism 36 is used for moving upward and pulling a printed object by adhesion between the film and a printed object so as to drive the material box 372 to move together during release. The plurality of motion guide components 38 are used for enabling the material box 372 to follow the printing mechanism for a certain distance between the upper limit structures and the lower limit structures to realize release of the film.

For example, the plurality of motion guide components 38 are spring components, pneumatic components, hydraulic components or electric components with an upper limit structure and, optionally, a lower limit structure.

For example, the plurality of motion guide components 38 comprise a guide rod 381, an upper spring 382, a lower spring 383 and an upper spring adjuster, and the upper limit structure is the upper string adjuster. For example, the upper spring adjuster may be a nut, and the lower limit structure may be just the material box foundation 371 or a lower spring adjuster, e.g., a nut.

The guide rod 381 passes through the peripheral edge of the material box 372 and is then fixed on the material box foundation 371.

The upper spring 382 wraps around the portion of the guide rod 381 which is above the upper surface of the material box 372, the upper spring adjuster is adjustably fixed to the guide rod 381 and the upper spring adjuster is located on the top of the upper spring 382, and the upper spring 382 is pushed against an upper surface of the material box 372 through the upper spring adjuster.

The lower spring 383 wraps around the portion of the guide rod 381 which is below a lower surface of the material box 372. When the lower limit structure is the lower spring adjuster, the lower spring adjuster is adjustably fixed to the guide rod 381 and the lower spring adjuster is located below the upper spring 383, and the lower spring 383 is pushed against the lower surface of the material box 372 through the lower spring adjuster. When the lower limit structure is just the material box foundation 371, the lower spring 383 is pushed against the upper surface of the material box foundation 371 and the lower surface of the material box 372.

A projecting stop structure (not shown) is also disposed on the guide rod 381 and above the upper spring adjuster.

A film 39 is placed on an upper surface of the glass plate in the material box 372 through tooling for stretching the film and by using a retainer ring 373. The film 39 may be a Teflon film, and the film 39 and the glass plate adhere to each other because of the adhesion of both.

After addition of expected material into the material box 372 and before release, the upward elastic force of the lower springs 383+the weight of the material box 372+the weight of the expected material=the downward elastic force of the upper springs 382 is kept, so that the film 39 is placed on the upper surface of the glass plate in a tightly attached state. During release, when a printing platform moves upward to overcome the adhesion and pulls the printed object, the upper springs 382 are compressed to generate downward stress and the lower springs 383 are elongated so that their upward elastic force is reduced, that is, the balance of the above equation will be broken, and as a result, the film 39 and the glass plate start to separate slowly and oxygen enters between the film 39 and the glass plate, thus completing the first stage of release of the film from the glass plate. At this point, adhesion exists between the film and the printed object, and the downward elastic force of the upper springs 382+the weight of the material box 372 and the gravity of the expected material<the upward elastic force of the lower springs 383+the upward force of the printing platform. Therefore, the material box 372 will follow the printing platform to move upward for a certain distance until the downward elastic force of the upper springs 382+the gravity of the material box 372+the gravity of the expected material>the upward elastic force of the lower springs 383+the upward force of the printing platform, so that the film 39 and the glass plate are separated completely, thus completing the second stage of release of the film from the printed object. After the second stage of release is completed, the printing platform continues to move upward to a preset height (e.g., 6 mm to 10 mm, e.g., 8 mm) for pulling film to complete the first layer printing process.

In the process of printing, the magnitude of the adhesion produced by release mainly depends on the oxygen permeability of the film, because oxygen can prevent material from curing. At the first stage, the film is released from the glass plate. While release is started, oxygen gradually passes through the film to enter an upper portion of the resin box and attaches to a contact surface of the material on the film as the film is separated from the glass plate. Through such a section-by-section release, the presence of oxygen on the film and the contact surface of the material is always guaranteed, thus realizing low release sound and prolonging the service life of the film.

Therefore, in the aforementioned release processes at the first and second stages, the material box follows the printing mechanism for a certain distance due to the elastic effect of the upper springs and the lower springs to carry out multi-section release, thus preventing the film from being easily torn. The section-by-section release reduces the deformation of the film in the process of release, lowers the sound during release, and prolongs the service life of the film. Further, due to the separated arrangement of the material box and the material box foundation, the mounting dimensions of the designed projective plane will not be affected when the material box is replaced, the universality of the material box is ensured, and the manufacturing cost for replacing the material box can be reduced. During release, the material box can move up and down along with the up and down of the printing platform to realize 3D printing of different layers. By fixing the glass plate on the material box foundation, the glass plate can be always kept still in the process of printing, that is, the projective plane is kept still, and therefore, the 3D printing precision and quality of the 3D printing device can be improved. In addition, because no projective plane is provided on the upper portion of the material box, the requirement for planeness is extremely low.

Figure 5:
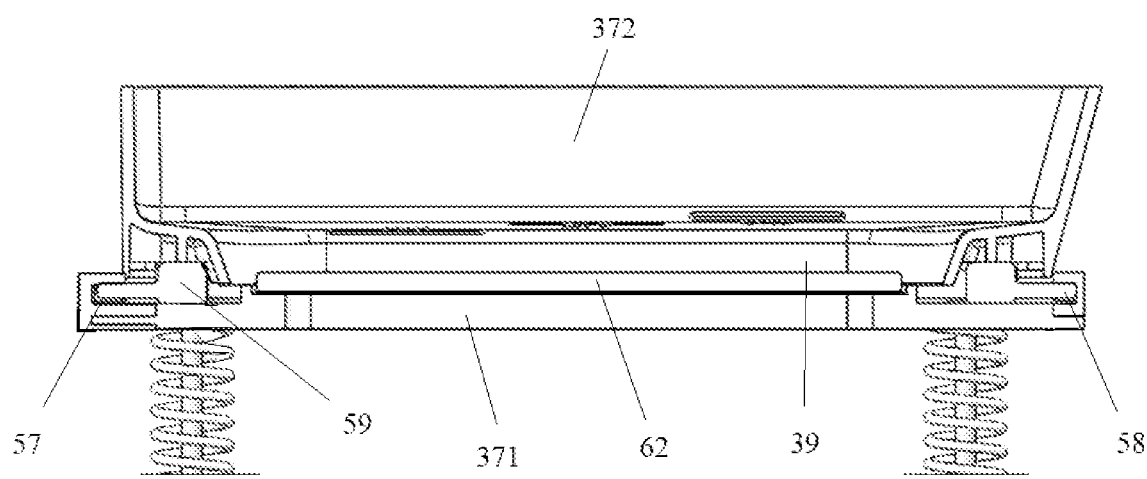
FIG. 5 is a cross-sectional structural schematic diagram of the combination of a material box foundation and a material box of another 3D printing device according to another embodiment of the present application.

In another embodiment of the present application, the material box 372 may not be connected to the material box foundation 371 through the motion guide component 38. Instead, the material box 372 is detachably fixed with the material box foundation 371 through a first fastener 57 and a second fastener 58. As shown in FIG. 5, provided is a cross-sectional structural schematic diagram of the combination of a material box foundation and a material box of another 3D printing device according to another embodiment of the present application. A light-transmitting glass plate 62 is fixed on the material box foundation 371. For example, the glass plate 62 is fixed to the upper surface of the material box foundation 371 by applying fixing glue on the perimeter of the glass plate 62. For example, the fixing glue may be AB glue. Then, the material box 372 is located on the glass plate 62 and is detachably fixed with the material box foundation 371 through the first fastener 57 and the second fastener 58.

A film 39 is placed on an upper surface of the glass plate 62 in the material box 372 through tooling for stretching the film and by using a retainer ring 59. The film 39 may be a Teflon film, and the film 39 and the glass plate 62 adhere to each other because of the adhesion of both.

Therefore, due to the separated arrangement of the material box and the material box foundation, the mounting dimensions of the designed projective plane will not be affected when the material box is replaced, the universality of the material box is ensured, and the manufacturing cost for replacing the material box can be reduced.

Due to the separated arrangement of the material box and the material box foundation, the mounting dimensions of the designed projective plane will not be affected when the material box is replaced, the universality of the material box is ensured, and the manufacturing cost for replacing the material box can be reduced. During release, the material box can move up and down along with the up and down of the printing platform to realize 3D printing of different layers. By fixing the glass plate on the material box foundation, the glass plate can be always kept still in the process of printing, that is, the projective plane is kept still, and therefore, the 3D printing precision and quality of the 3D printing device can be improved. In addition, because no projective plane is provided on the upper portion of the material box, the requirement for planeness is extremely low.

Figure 6:
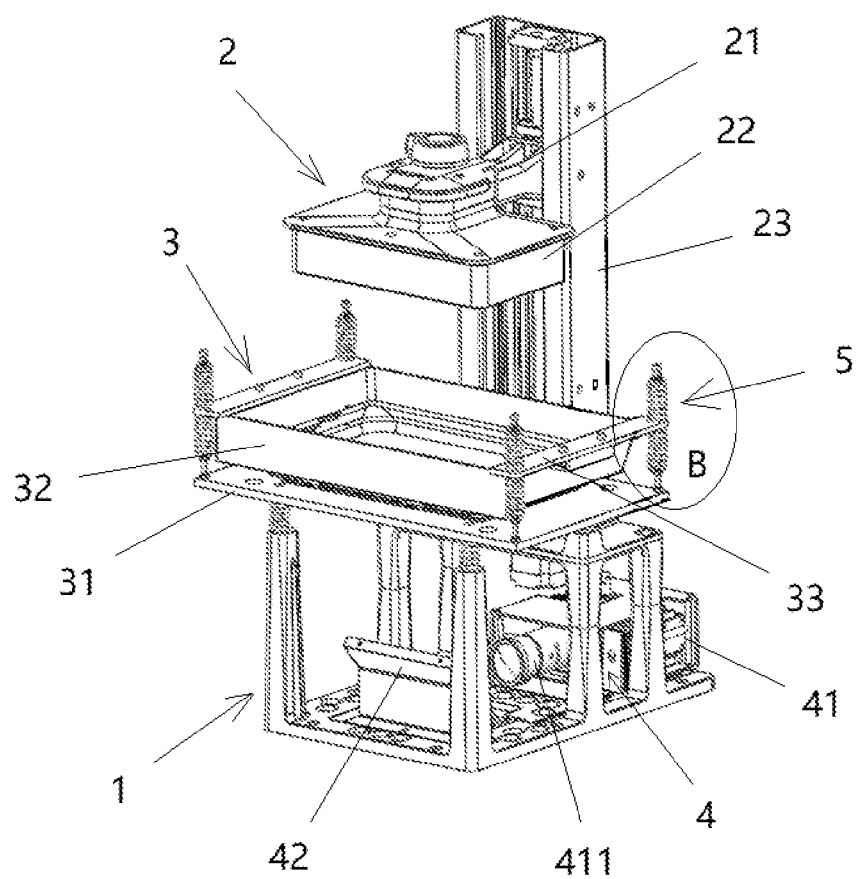
FIG. 6 is a structural schematic diagram of another 3D printing device according to another embodiment of the present application.
Figure 7:
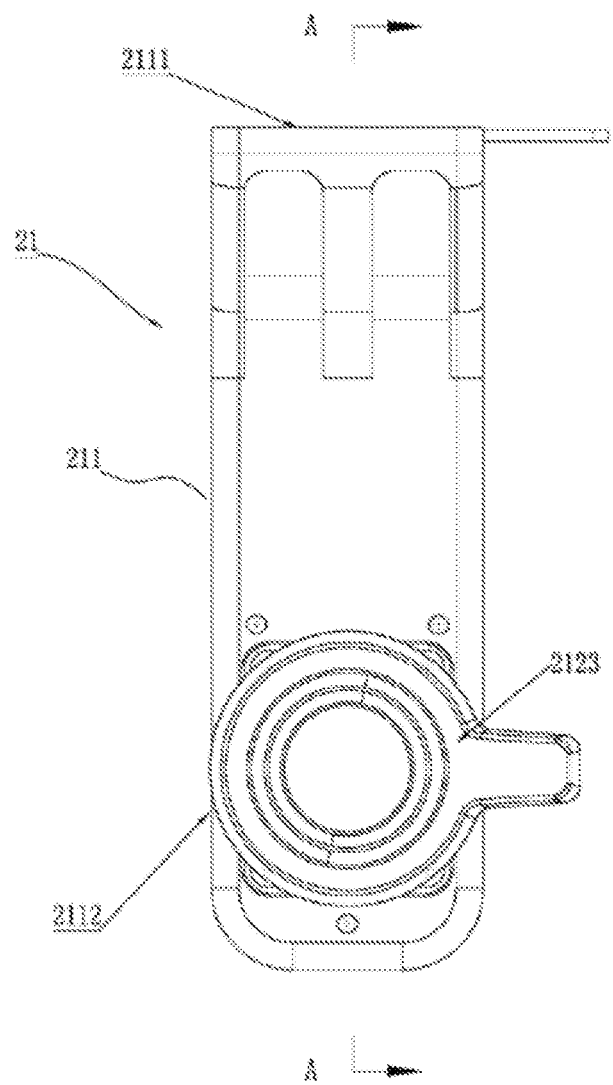
FIG. 7 is a top view of a printing arm of the 3D printing device in FIG. 6.
Figure 8:
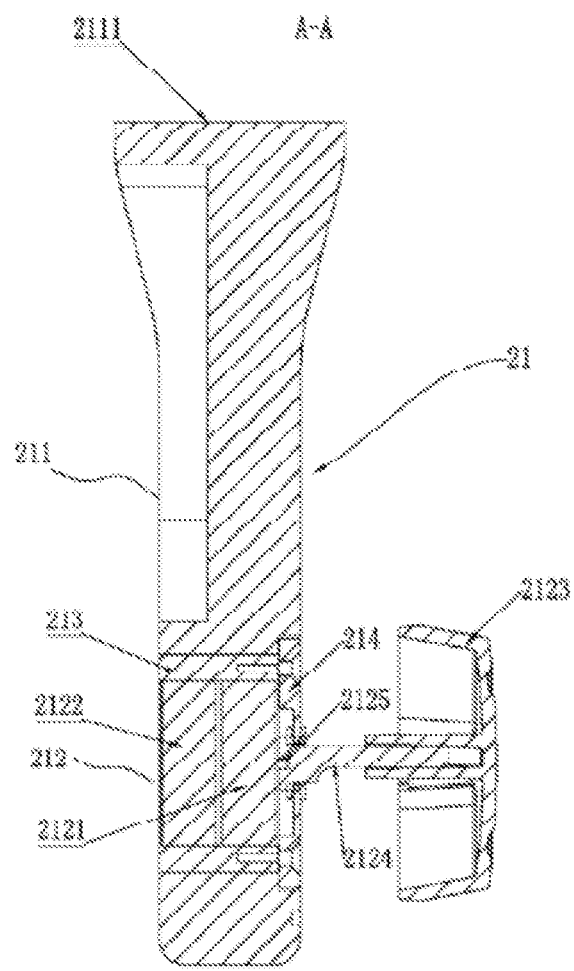
FIG. 8 is an A-A sectional view of FIG. 7.
Figure 9:
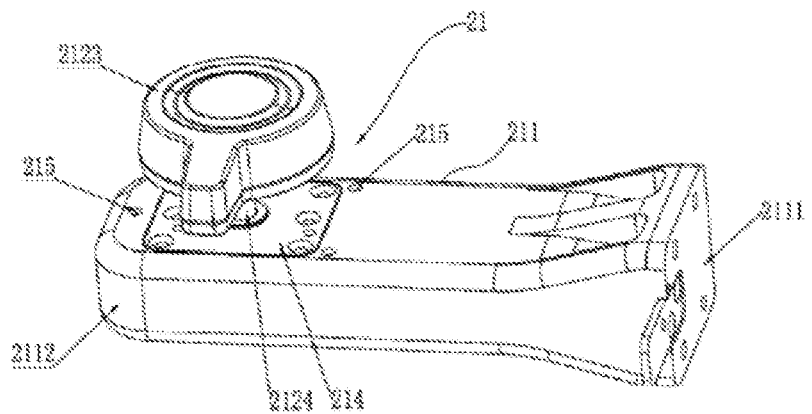
FIG. 9 is a three-dimensional structural schematic diagram of the printing arm of the 3D printing device in FIG. 6.
Figure 10:
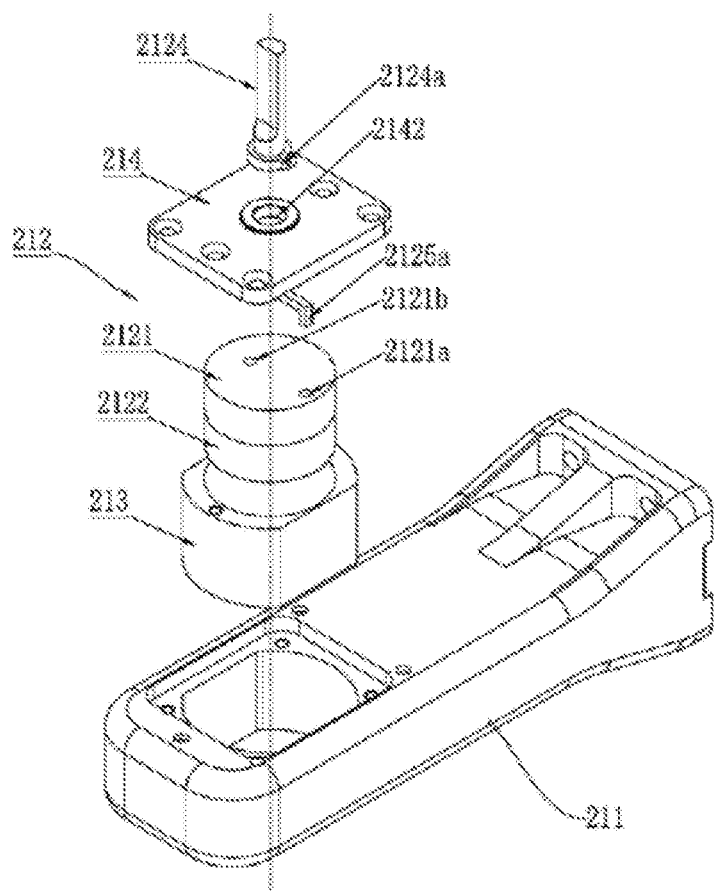
FIG. 10 is a structural exploded diagram of a magnetic component in the printing arm in FIG. 9.
Figure 11:
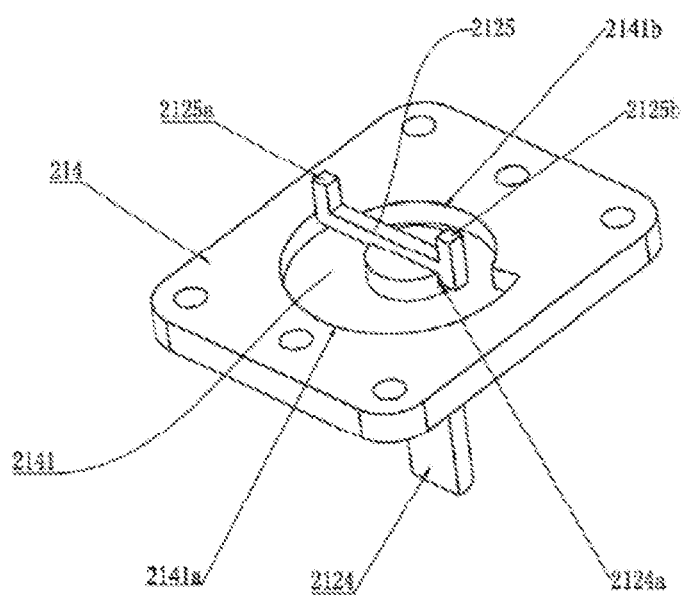
FIG. 11 is a fittingly mounted diagram of a rotary shaft, an electromagnetic cover plate and a limit rod in the printing arm in FIG. 9.

As shown in FIG. 6, FIG. 6 is a structural schematic diagram of another 3D printing device according to another embodiment of the present application. The 3D printing device comprises a printing mechanism 2, a liquid containing mechanism 3 and an exposure mechanism 4 mounted on a base 1, wherein the printing mechanism 2 is located above the liquid containing mechanism 3, and the exposure mechanism 4 is located below the liquid containing mechanism 3.

The printing mechanism 2 comprises a module 23 and a printing platform slidably mounted on the module 23, and the module 23 is vertically mounted on the base 1 and has a slide groove for upward and downward sliding.

The printing platform comprises a printing arm 21 and a platform assembly 22 detachably mounted on the printing arm 21. The platform assembly 22 is attracted and fixed to the printing arm 21 through a magnetic component. The other end of the printing arm 21 is mounted in the slide groove of the module 23, and the printing platform can slide up and down along the slide groove through the printing arm 21.

The liquid containing mechanism 3 comprises a material box foundation 31 and a material box 32 detachably mounted on the material box foundation 31, the material box foundation 31 is horizontally mounted on the base 1, and an upward side of the material box 32 faces the printing mechanism 2 with a space therebetween, i.e., being spaced apart from the platform assembly 22. The material box 32 is a bottom-less basin, the shape of which may be round, square or rectangular and is not limited by the present application.

In another embodiment of the present application, the liquid containing mechanism 3 further comprises a light-transmitting glass plate 34, and the material box foundation 31 is a rigid annular plate with a mounting groove, e.g., an annular glass plate, an annular plastic board or an annular metal plate. For example, the annular metal plate may be an annular aluminum plate or an annular aluminum alloy plate. The mounting groove in the middle of the material box foundation 31 directly faces the bottom of the material box 32, and the size and shape of the mounting groove are determined according to the size and shape of the bottom of the material box 32. Optionally, the area of the mounting groove is larger than or equal to the area of the bottom of the material box 32, so that the light emitted by the exposure mechanism 4 can pass through the mounting groove to enter the material box 32.

The glass plate 34 is fixedly mounted on the material box foundation 31 and covers the mounting groove of the material box foundation 31, and the material box 32 is located above the glass plate 34.

In another embodiment of the present application, the material box foundation 31 and the material box 32 are detachably fixed to each other at their peripheries through a plurality of motion guide components 5, e.g., three, four or more motion guide components 5. For example, the material box 32 is fixed to the material box foundation 31 through four motion guide components 5 at four corners of its periphery. In another embodiment of the present application, the material box 32 may also have any other shapes. For example, the whole shape of the material box 32 may be cylindrical.

The plurality of motion guide components 5 are fixed to the peripheral edge of the material box 32 and then detachably fixed on the material box foundation 31. For example, the plurality of motion guide components 5 pass through the peripheral edge of the material box 32 and are then detachably fixed on the material box foundation 31. Each of the motion guide components 5 is a following component with an upper limit structure and a lower limit structure, and the following component is fixed to the peripheral edge of the material box 32.

The printing mechanism 2 is used for moving upward and pulling a printed object by adhesion between the film and the printed object so as to drive the material box 32 to move together during release. The plurality of motion guide components 5 are used for enabling the material box 32 to follow the printing mechanism 2 for a certain distance between the upper limit structures and the lower limit structures to realize release of the film 39.

In another embodiment of the present application, the edge of the bottom of the material box 32 is also provided with a heating ring, through which a printing solution can be heated, so that the printing solution will not be frozen even at low temperature. The heating ring normally clings to the perimeter of the bottom of the material box 32, and a heating wire, a thermistor or the like may be adopted as the heating ring.

As shown in FIG. 6, the exposure mechanism 4 is located below the material box foundation 31 and mounted on the base 1, and a patterned light source emitted out of an exposure opening 411 of the exposure mechanism 4 directly irradiates or is reflected to the bottom of the material box 32. For example, the exposure mechanism 4 comprises a projector 41 and a reflector 42, and the patterned light source emitted out of the exposure opening 411 of the projector 41 passes through the mounting groove of the material box foundation 31 after being reflected by the reflector 42, and then passes through the glass plate 34 and the material box 32 to irradiate a bottom (i.e., a forming plane) of the platform assembly 22.

A control panel (not shown) is provided on the base 1 and is connected to a control module (not shown) of the 3D printing device. Specifically, a touch screen may be adopted and human-machine interaction can be realized through the touch screen, so that the printing process is more convenient and intelligent.

In the present embodiment, as shown in FIGS. 7-11, the printing arm 21 comprises a printing arm body 211; a connecting end 2111 of the printing arm body 211 is movably mounted on the module 23 of the 3D printing device; a free end 2112 of the printing arm body 211 is provided with a magnetic component 212 and the magnetic component 212 comprises a first magnet 2121 and a second magnet 2122 that are respectively disposed at an upper position and a lower position; and a control switch 2123 is connected to the first magnet 2121 through a rotary shaft 2124, and the first magnet 2121 is rotated as the control switch 2123 is rotated.

In the present embodiment, the first magnet 2121 is a strong magnet, while the second magnet 2122 is a weak magnet. The first magnet 2121 and the second magnet 2122 are respectively arranged at an upper position and a lower position in a magnet socket 213, wherein the second magnet 2122 located at the lower position is fixedly mounted in the magnet socket 213, that is, the second magnet 2122 will not be rotated as the control switch 2123 is rotated. The first magnet 2121 is movably mounted in the magnet socket 213. To facilitate the rotation of the first magnet 2121, the first magnet 2121 and the second magnet 2122 can be kept at a certain distance from each other, that is, the depth of the magnet socket 213 is greater than the sum of the thickness of the first magnet 2121 and that of the second magnet 2122. A cover plate 214 is fixedly mounted on the side of the magnet socket 213 which is close to the control switch 2123. The cover plate 214 is used, on one hand, for covering the first magnet 2121 to prevent the first magnet 2121 from being ejected out of the magnet socket 213 when the same magnetic poles repel each other, and on the other hand for controlling a rotation angle of the first magnet 2121. Wherein, the cover plate 214 controls the rotation angle of the first magnet 2121 through the following specific arrangement method: the side of the cover plate 214 which is close to the first magnet 2121 is provided with a counterbore 2141, and the center of the counterbore 2141 is provided with a through hole 2142 for the passage of the rotary shaft 2124. The counterbore 2141 consists of a large-diameter arc section 2141a and a small-diameter arc section 2141b. A bottom of the rotary shaft 2124 is provided with a limit rod 2125, both ends of which are provided with connecting posts 2125a and 2125b facing the first magnet 2121, respectively. The connecting posts 2125a and 2125b are respectively placed in two connecting holes 2121a and 2121b of the first magnet 2121. A main body of the limit rod 2125 is mounted in a recess 2124a which runs through the bottom of the whole rotary shaft 2124. When the rotary shaft 2124 is rotated, the limit rod 2125 drives the first magnet 2121 to rotate. The distance that the limit rod 2125 covers from the connecting post 2125a of the rotary shaft 2124 to the rotary shaft 2124 is less than the radius of the large-diameter arc section 2141a but greater than that of the small-diameter arc section 2141b. Such arrangement can limit the rotation angle of the limit rod 2125, and thus the rotation of the first magnet 2121 within a set angle in the magnet socket 213 is controlled to prevent its excessive rotation. In order to facilitate the rotation of the first magnet 2121, the two connecting holes 2121a and 2121b of the first magnet 2121 are eccentrically disposed, that is, the limit rod 2125 is not disposed at the central area of the first magnet 2121.

The operating principle of the aforementioned magnetic component 212 is as follows: when the control switch 2123 is rotated to an open state, the first magnet 2121 and the second magnet 2122 respectively disposed at the upper position and the lower position have the same polarity at the same end. At this point, the upper first magnet 2121 and the lower second magnet 2122 repel each other according to the principle that the same magnetic poles repel each other, and only the second magnet 2122 of the whole magnetic component 212 can generate magnetism, that is, the magnetic component 212 is in a weak magnetic state at this time. When the control switch 2123 is rotated to a close state, the first magnet 2121 and the second magnet 2122 respectively disposed at the upper position and the lower position have different polarities at the same end. At this point, the upper first magnet 2121 and the lower second magnet 2122 attract each other according to the principle that the different magnetic poles attract each other, the magnetism of the whole magnetic component 212 is generated by the first magnet 2121 and the second magnet 2122 together, and the magnetic component 212 is in a strong magnetic state at this time.

Figure 12:
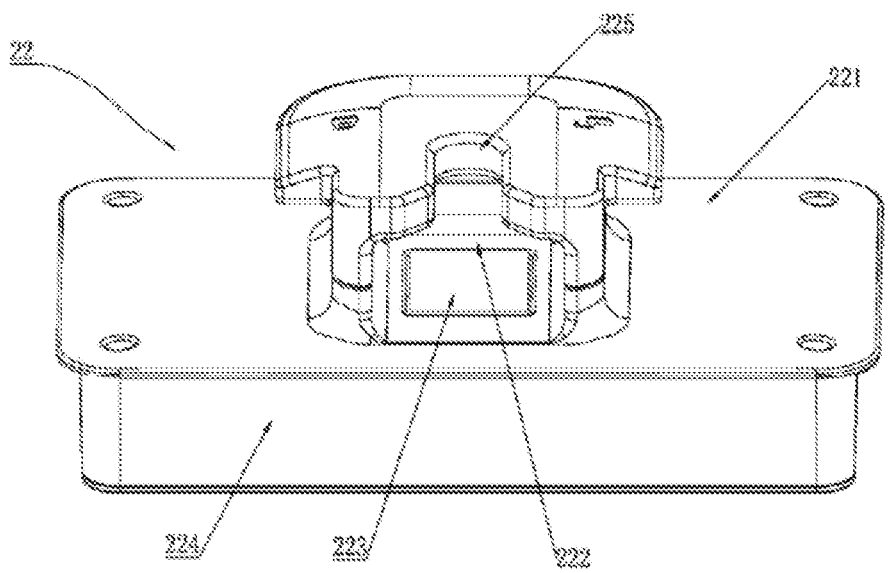
FIG. 12 is a three-dimensional structural schematic diagram of a platform assembly of the 3D printing device in FIG. 6.

As shown in FIG. 12, FIG. 12 is a three-dimensional structural schematic diagram of the platform assembly of the 3D printing device in FIG. 6. The platform assembly 22 comprises a housing 221, which is provided with an accommodating cavity 222 into which the free end 2112 of the printing arm body extends. A bottom of the accommodating cavity 222 is provided with a magnetic metal part 223 corresponding to a bottom of the second magnet 2122, and the magnetic metal part 223 may be an iron sheet or other metal parts that can be attracted.

To ensure the accurate mounting of the printing arm 21 and the platform assembly 22, the printing arm body 211 is provided with at least three positioning holes 215, and elastic positioning posts which respectively correspond to the positioning holes 215 are provided in the accommodating cavity 222. The positioning post comprises a positioning bead and an elastic part, and the positioning bead is elastically embedded in the positioning hole 215 through the elastic part.

A U-shaped groove 225 into which the rotary shaft 2124 can move is also provided above the accommodating cavity 222. An integrated printing table 224 is provided at a bottom of the housing 221 of the platform assembly. The integrated printing table 224 makes printing more convenient, and no seepage will occur.

Since the printing arm 21 and platform assembly 22 of the 3D printing platform of the present application are attracted and fixed together by the magnetic component 212, the mounting and dismounting are convenient. During operation, the free end 2112 of the printing arm body 211 extends into the accommodating cavity 222 of the platform assembly 22, and the printing arm body and the platform assembly are accurately aligned through the positioning holes 215 and the positioning posts. Then, the control switch 2123 is rotated, and the rotary shaft 2124 makes the first magnet 2121 and the second magnet 2122 have different polarities at the same end, so that the two attract each other to generate strong attractive force, and thus the magnetic metal part 223 located at the bottom of the accommodating cavity 222 is attracted, and thereby the platform assembly 22 is steadily mounted on the printing arm 21. When the platform assembly 22 needs to be removed from the printing arm 21, the attractive force of the first magnet 2121 and the second magnet 2122 is reduced by rotating the control switch 2123, so that the platform assembly 22 is quickly removed from the printing arm 21.

In addition to the structure of the magnetic component in the aforementioned embodiment, electromagnets may also be adopted to replace the ordinary magnets. For example, the printing arm 21 comprises a printing arm body 211, a connecting end 2111 of the printing arm body 211 is movably mounted on a module 23 of the 3D printing device, and a free end 2112 of the printing arm body is provided with a magnetic component 212. The magnetic component 212 comprises an electromagnet and a control switch for controlling the magnetism of the electromagnet, the electromagnet is connected to a power supply, and the control switch controls the on and off of the power supply of the electromagnet. When the control switch is opened (that is, the power supply of the electromagnet is cut off), the electromagnet does not have magnetism, and when the control switch is closed (that is, the power supply of the electromagnet is switched on), the electromagnet is in a strong magnetic state. The magnetic attraction between the platform assembly 22 and the printing arm 21 is realized by the electromagnet.

In the present embodiment, the material box foundation 31 and the material box 32 may be detachably mounted in the following way.

Figure 13:
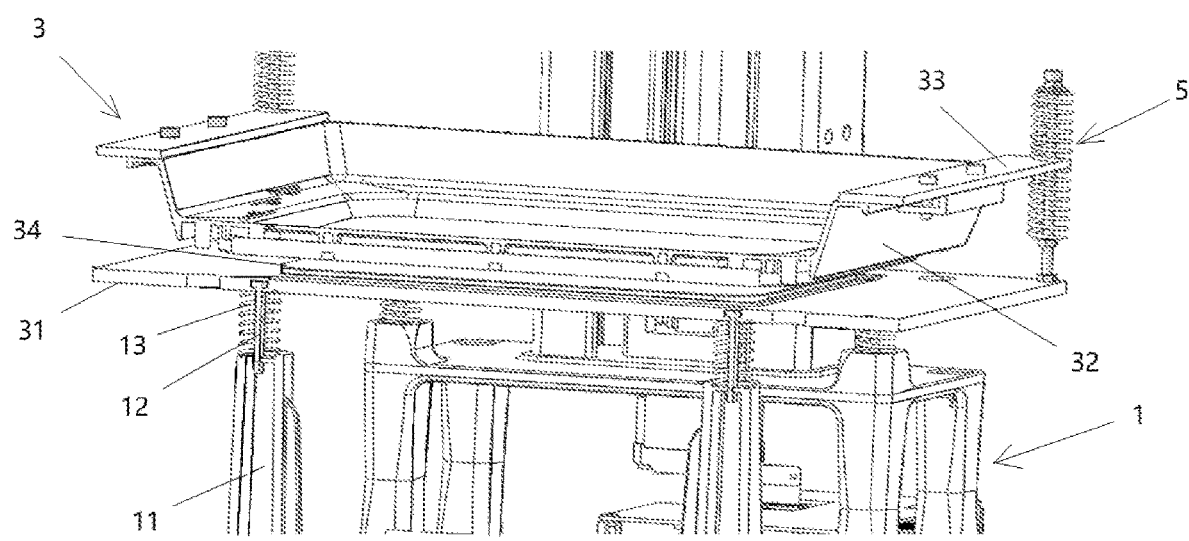
FIG. 13 is an enlarged structural schematic diagram of partial cross-sections of the combinations of the material box foundation with the base and the material box respectively in FIG. 6.

As shown in FIG. 13, provided is an enlarged structural schematic diagram of partial cross-sections of the combinations of the material box foundation with the base and the material box respectively in FIG. 6. With reference to FIG. 6 and FIG. 13, the material box foundation 31 is a rigid annular plate with a mounting groove and is detachably mounted on the base 1. For example, the base 1 is provided with a plurality of upward support pillars 11, e.g., three or four support pillars 11, which are each located on the perimeter of the base 1. Optionally, in the present embodiment, taking four support pillars 11 as an example for illustration, the four support pillars 11 are located at the four corners of the base 1.

The material box foundation 31 is detachably fixed to the support pillar 11 through an adjusting rod 12. For example, the adjusting rod 12 may be a screw or a bolt. A top surface of the support pillar 11 and a bottom of the material box foundation 31 are each provided with an adjusting hole mating with the adjusting rod 12, wherein the adjusting hole of the material box foundation 31 may be a through hole, and an internal surface of the adjusting hole in the top surface of the support pillar 11 is provided with a thread, that is, the adjusting hole in the top surface of the support pillar 11 is a threaded hole. The adjusting rod 12 is fixed in the adjusting hole of the support pillar 11 after passing through the through hole. For example, one end of the adjusting rod 12 is mounted in the adjusting hole of the material box foundation 31, the other end of the adjusting rod 12 is mounted in the adjusting hole at the top end of the support pillar 11, and the material box foundation 31 can be driven to be adjusted downward for a certain distance by rotating the adjusting rod 12. In the present embodiment, the material box foundation 31 can be kept in a horizontal position by adjusting one or more or all the adjusting rods 12 on the perimeter of the material box foundation 31. For example, a horizontal bubble (not shown) may be arranged on the upper surface of the material box foundation 31.

In another embodiment of the present application, an adjusting spring 13 wraps around the adjusting rod 12, and two ends of the adjusting spring 13 contact against the upper surface of the support pillar 11 and the lower surface of the material box foundation 31 respectively. By adjusting the upward and downward motion of one or more or all of the adjusting rods 12, the parallelism between a bottom surface of the whole material box 32 and a bottom surface (i.e., the forming plane) of the printing table 224 is adjusted, thus ensuring that the thickness of the printed layer is completely uniform.

As shown in FIG. 13, the mounting groove of the material box foundation 31 is covered by a light-transmitting glass plate 34, which is fixed to the upper surface of the material box foundation 31. For example, the glass plate 34 is fixed to the upper surface of the material box foundation 31 by applying fixing glue on the perimeter of the glass plate 34. For example, the fixing glue may be AB glue. The size and shape of the glass plate 34 may be determined according to the size and shape of the material box 32.

Figure 14:
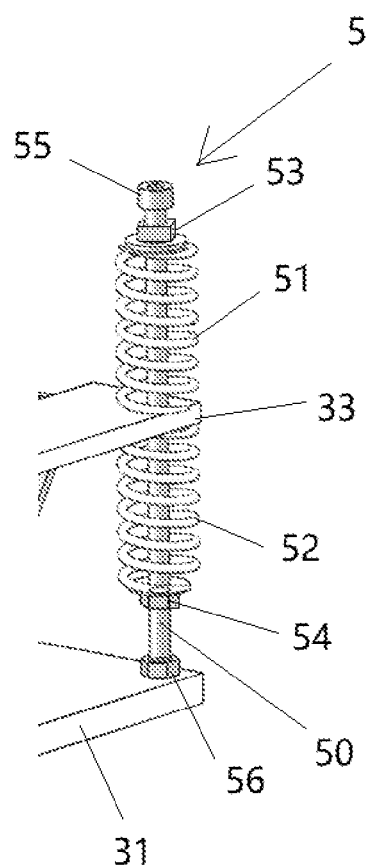
FIG. 14 is an enlarged diagram of area B in FIG. 6.
Figure 15:
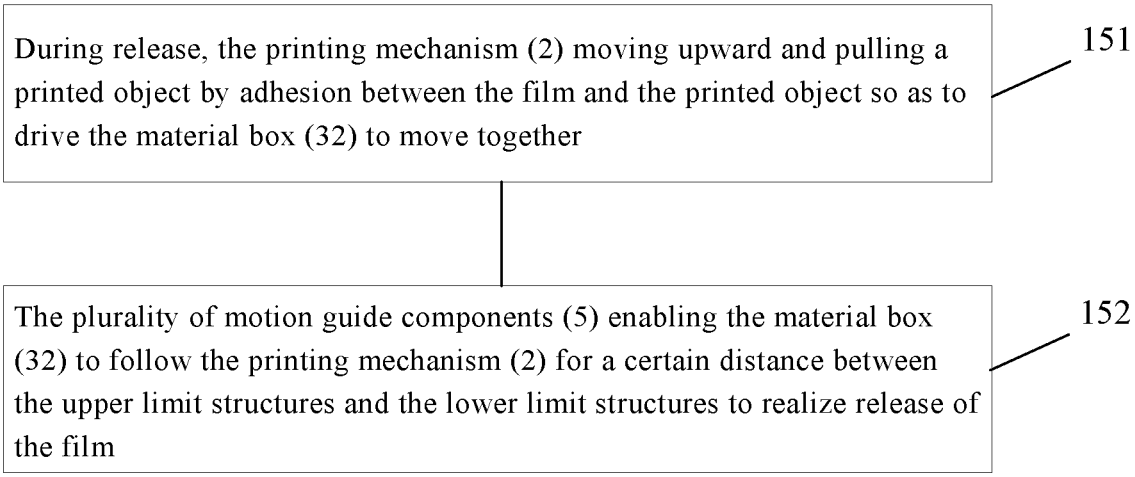
FIG. 15 is a schematic process diagram of a release method for a 3D printing device according to another embodiment of the present application.

The combination of the material box foundation 31 and the material box 32 can be as shown in FIGS. 6, 13 and 14, wherein FIG. 14 is an enlarged view of area B in FIG. 6. The following component comprises a guide rod 50, an upper spring 51, a lower spring 52, an upper spring adjuster 53 and a lower spring adjuster 54. The upper limit structure is the upper spring adjuster 53, and the lower limit structure is the lower spring adjuster 54.

The guide rod 50 passes through the peripheral edge of the material box 32 and is then fixed on the material box foundation 31. For example, the edge of the material box 32 is provided with an outward (e.g., horizontally outward) fixing plate 33, wherein the fixing plate 33 may be an outwardly extending edge of the material box 32, that is, the fixing plate 33 is a portion of the material box 32 and may be integrally formed. In another embodiment of the present application, the fixing plate 33 may also be a single fixing plate, and the fixing plate 33 is fixed to an upper edge of the material box 32, for example, by bolts or welding. The upper surface of the material box foundation 31 is provided with a fixing hole, and the fixing plate 33 is provided with a through hole corresponding to the position of the fixing hole. The guide rod 50 passes through the through hole of the fixing plate 33 and is then fixed in the fixing hole in the upper surface of the material box foundation 31. For example, the fixing hole may be a threaded hole, and the fixed end of the guide rod 50 for being fixed to the material box foundation 31 is provided with a thread mating with the thread of the threaded hole.

In order to further fix the guide rod 50, the guide rod 50 may also be fixed on the material box foundation 31 by a nut 56. For example, the nut 56 is located on the upper surface of the material box foundation 31 to fix the guide rod 50 on the material box foundation 31, or the nut 56 is located on the lower surface of the material box foundation 31 to fix the guide rod 50 on the material box foundation 31, or two nuts 56 are respectively located on the upper surface and lower surface of the material box foundation 31 to fix the guide rod 50 on the material box foundation 31, which is not limited by the present embodiment.

The upper spring 51 wraps around the portion of the guide rod 50 which is above the upper surface of the material box 32, the upper spring adjuster 53 is adjustably fixed to the guide rod 50 and the upper spring adjuster 53 is located on the top of the upper spring 51, and the upper spring 51 is pushed against an upper surface of the material box 32 through the upper spring adjuster 53. For example, the upper spring 51 wraps around the portion of the guide rod 50 which is above the fixing plate 33, a top end of the upper spring 51 is provided with the upper spring adjuster 53 adjustably fixed to the guide rod 50, and the upper spring 51 is pushed against an upper surface of the fixing plate 33 through the upper spring adjuster 53. The upper spring adjuster 53 may be a nut, and corresponding to the upper spring adjuster 53, the guide rod 50 is provided with a thread mating with the upper spring adjuster 53.

In order to limit the upward and downward adjustment range of the upper spring adjuster 53 and prevent the upper spring adjuster 53 from loosening, a projecting stop structure 55 is also provided on the guide rod 50 and above the upper spring adjuster 53. For example, the stop structure 55 is located on the top of the guide rod 50. For example, the stop structure 55 is a ring with a diameter greater than that of the guide rod 50. The stop structure 55 may be integrally formed with the guide rod 50, or may be fixed to the guide rod 50 through a thread.

The lower spring 52 wraps around the portion of the guide rod 50 which is below a lower surface of the material box 32, the lower spring adjuster 54 is adjustably fixed to the guide rod 50 and the lower spring adjuster 54 is located below the upper spring 52, and the lower spring 52 is pushed against the lower surface of the material box 32 through the lower spring adjuster 54. For example, the lower spring 52 wraps around the portion of the guide rod 50 which is located below the fixing plate 33, that is, the lower spring 52 is located between the material box foundation 31 and the fixing plate 33, and a lower end of the lower spring 52 is provided with the lower spring adjuster 54 adjustably fixed to the guide rod 50, and the lower spring 52 is pushed against a lower surface of the fixing plate 33 through the lower spring adjuster 54. The lower spring adjuster 54 may be a nut, and corresponding to the lower spring adjuster 54, the guide rod 50 is provided with a thread mating with the lower spring adjuster 54.

By adjusting the upper spring adjusters 53 and/or the lower spring adjusters 54 to an upper position or a lower position, the material box 32 can be adjusted to an upper position or a lower position and placed in a horizontal position.

In another embodiment of the present application, by calculation, the sum of the downward elastic force of the upper springs 51, the gravity of the material box 32 and the gravity of the expected material is equal to the upward elastic force of the lower springs 52, so that the film in a resin box 3 is placed upon the glass plate 34 in a tightly attached and balanced state. The elastic force of the upper springs 51 and the lower springs 52 may be calculated according to the elastic coefficients of the springs, e.g., according to the equation F=−kx, wherein F is the elastic force of a spring, k is an elastic coefficient, and x is deformation.

During printing, a film 39 is placed on an upper surface of the glass plate 34 in the material box 32 through tooling for stretching the film and by using a retainer ring. The film 39 may be a Teflon film, and the film 39 and the glass plate 34 adhere to each other because of the adhesion of both.

After addition of the expected material into the material box 32 and before release, the upward elastic force of the lower springs 52+the weight of the material box 32+the weight of the expected material=the downward elastic force of the upper springs 51, so that the film 39 is placed on the upper surface of the glass plate 34 in a tightly attached state. During release, the printing platform moves upward to overcome the adhesion between the film 39 and a printed object; when the printed object is pulled to drive the material box 32 to move upward for a certain distance, the upper springs 51 are compressed to generate downward stress, so that the lower springs 52 are elongated so that their upward elastic force is reduced, that is, the balance of the above equation will be broken, and as a result, the film 39 and the glass plate 34 start to separate slowly and oxygen enters between the film 39 and the glass plate 34, thus completing the first stage of release of the film from the glass plate 34. At this point, adhesion exists between the film and the printed object, and the downward elastic force of the upper springs 51+the gravity of the material box 32+the gravity of the expected material<the upward elastic force of the lower springs 52+the upward force of the printing platform. Therefore, the material box 32 will follow the printing platform to move upward for a certain distance until the downward elastic force of the upper springs 51+the gravity of the material box 32+the gravity of the expected material>the upward elastic force of the lower springs 52+the upward force of the printing platform, so that the film 39 and the glass plate 34 are separated completely, thus completing the second stage of release of the film from the printed object. After the second stage of release is completed, the printing platform continues to move upward to a preset height (e.g., 6 mm to 10 mm, e.g., 8 mm) for pulling film to complete the first layer printing process.

Moreover, in the release processes at the first stage and the second stage described above, because of the upper springs 51 and the lower springs 52, the material box 32 can follow the printing mechanism 2 for a certain distance to realize release of the film, and thereby the risk of the film being damaged due to too fast release can be avoided.

The motion guide component 5 described in the aforementioned embodiment can realize multiple times of release through the upper and lower springs. In another embodiment of the present application, the motion guide component 5 may also be a pneumatic component, a hydraulic component or an electric component with an upper limit structure and a lower limit structure to realize multiple times of release.

Another embodiment of the present application further provides a release method for a 3D printing device. The 3D printing device comprises a base 1, a printing mechanism 2, a liquid containing mechanism 3 and an exposure mechanism 4, wherein the printing mechanism 2 is located above the liquid containing mechanism 3, and the exposure mechanism 4 is located below the liquid containing mechanism 3.

The liquid containing mechanism 3 comprises a material box foundation 31, a material box 32 and a plurality of motion guide components 5, the material box 32 is detachably mounted on the material box foundation 31 through the plurality of motion guide components 5, and an upward side of the material box 32 is spaced apart from the printing mechanism 2 above.

The liquid containing mechanism 3 further comprises a light-transmitting glass plate 34, the material box foundation 31 is a rigid annular plate with a mounting groove and is detachably mounted on the base 1, the mounting groove of the material box foundation 31 is covered by the glass plate 34, and the glass plate 34 is fixed to an upper surface of the material box foundation 31.

The plurality of motion guide components 5 are fixed to the peripheral edge of the material box 32 and then detachably fixed on the material box foundation 31, and the material box 32 is disposed on the glass plate 34.

Each of the motion guide components 5 is a following component with an upper limit structure and a lower limit structure.

The glass plate 34 is used for placement of a film on an upper surface thereof in the material box 32.

The release method comprises:

step 151: during release, the printing mechanism 2 moving upward and pulling a printed object by adhesion between the film and the printed object so as to drive the material box 32 to move together; and step 152: the plurality of motion guide components 5 enabling the material box 32 to follow the printing mechanism 2 for a certain distance between the upper limit structures and the lower limit structures to realize release of the film.

Each of the motion guide components 5 comprises a guide rod 50, an upper spring 51, a lower spring 52, an upper spring adjuster 53 and a lower spring adjuster 54, the upper spring adjuster 53 is the upper limit structure, and the lower spring adjuster 54 is the lower limit structure.

The guide rod 50 passes through the peripheral edge of the material box 32 and is then fixed on the material box foundation 31.

The upper spring 51 wraps around the portion of the guide rod 50 which is above the upper surface of the material box 32, the upper spring adjuster 53 is adjustably fixed to the guide rod 50 and the upper spring adjuster 53 is located on the top of the upper spring 51, and the upper spring 51 is pushed against an upper surface of the material box 32 through the upper spring adjuster 53.

The lower spring 52 wraps around the portion of the guide rod 50 which is below a lower surface of the material box 32, the lower spring adjuster 54 is adjustably fixed to the guide rod 50 and the lower spring adjuster 54 is located below the upper spring 52, and the lower spring 52 is pushed against the lower surface of the material box 32 through the lower spring adjuster 54.

In the present embodiment, expected material is added into the material box 32, and before release, the upward elastic force of the lower springs 52+the weight of the material box 32+the weight of the expected material=the downward elastic force of the upper springs 51 is kept, so that the film 39 is placed on the upper surface of the glass plate 34 in a tightly attached state and adhesion exists therebetween.

During release, when the printing mechanism 2 moves upward to overcome the adhesion and pulls the printed object, the film 39 and the glass plate 34 start to separate slowly, so that oxygen enters between the film 39 and the glass plate 34, thus completing the first stage of release of the film from the glass plate 34, wherein at this point, adhesion exists between the film and the printed object, and the downward elastic force of the upper springs 51+the gravity of the material box 32+the gravity of the expected material<the upward elastic force of the lower springs 52+the upward force of the printing mechanism 2.

The upper springs 51 and the lower springs 52 drive the material box 32 to follow the printing mechanism 2 to move upward for a certain distance until the downward elastic force of the upper springs 51+the gravity of the material box 32+the gravity of the expected material>the upward elastic force of the lower springs 52+the upward force of the printing mechanism 2, so that the film 39 and the glass plate 34 are separated completely, thus completing the second stage of release of the film from the printed object.

To sum up, in the process of printing, the magnitude of the adhesion produced by release mainly depends on the oxygen permeability of the film, because oxygen can prevent material from curing. At the first stage, the film is released from the glass plate. While release is started, oxygen gradually passes through the film to enter an upper portion of the resin box and attaches to a contact surface of the material on the film as the film is separated from the glass plate. Through such a section-by-section release, the presence of oxygen on the film and the contact surface of the material is always guaranteed, thus realizing low release sound and prolonging the service life of the film.

Therefore, since a separated design (e.g., the separated arrangement of the material box and the material box foundation) is adopted for the 3D printing device, the mounting dimensions of the designed projective plane will not be affected when the material box is replaced, the universality of the material box is ensured, and the manufacturing cost for replacing the material box can be reduced. During release, the material box can move up and down along with the up and down of the printing platform to realize 3D printing of different layers. By fixing the glass plate on the material box foundation, the glass plate can be always kept still in the process of printing, that is, the projective plane is kept still, and therefore, the 3D printing precision and quality of the 3D printing device can be improved. The material box is connected to the material box foundation through the motion guide components and the motion guide components enable the material box to follow the printing mechanism for a certain distance to realize release of the film, and thus section-by-section release can be achieved, deformation of the film in the process of release is reduced, sound during release is lowered and service life of the film is prolonged. In addition, because no projective plane is provided on the upper portion of the material box, the requirement for planeness is extremely low.

The preferred specific embodiments of the present application have been described in detail above. It should be understood that many modifications and changes can be made by those of ordinary skill in the art without creative labor according to the concept of the present application. Therefore, any technical solution that can be obtained by those skilled in the art through logical analysis, reasoning or limited experiments on the basis of the prior art according to the concept of the present application shall fall within the protection scope determined by the claims.

The invention claimed is:
1. A 3D printing device, comprising
a base, a printing mechanism, a liquid containing mechanism and an exposure mechanism, wherein the printing mechanism is located above the liquid containing mechanism, and the exposure mechanism is located below the liquid containing mechanism;
the liquid containing mechanism comprises a material box foundation, a material box and a plurality of motion guide components, the material box is detachably mounted on the material box foundation through the plurality of motion guide components, and the material box is spaced apart from the printing mechanism above;
the liquid containing mechanism further comprises a light-transmitting glass plate, the material box foundation is a rigid annular plate with a mounting groove and is detachably mounted on the base, the mounting groove of the material box foundation is covered by the glass plate, and the glass plate is fixed to an upper surface of the material box foundation;
the plurality of motion guide components are fixed to a peripheral edge of the material box and then detachably fixed on the material box foundation, and the material box is placed on the glass plate;
the glass plate is configured for placing a film on an upper surface thereof located in the material box;
each of the plurality of motion guide components is a following component with an upper limit structure and a lower limit structure;
the printing mechanism is configured for moving upward and driving the material box to move together during release by adhesion between the film and a printed object; and
the plurality of motion guide components are configured for forcing the material box to follow the printing mechanism for a certain distance between the upper limit structures and the lower limit structures to release the film;
wherein:
each of the motion guide components comprises a guide rod, an upper spring, a lower spring, an upper spring adjuster and a lower spring adjuster, the upper spring adjuster is the upper limit structure, and the lower spring adjuster is the lower limit structure;
the guide rod passes through the peripheral edge of the material box and is fixed on the material box foundation;
the upper spring wraps around a portion of the guide rod above the upper surface of the material box, the upper spring adjuster is adjustably fixed to the guide rod and is located above the upper spring, and the upper spring is pushed against an upper surface of the material box through the upper spring adjuster; and
the lower spring wraps around a portion of the guide rod below a lower surface of the material box, the lower spring adjuster is adjustably fixed to the guide rod and is located below the lower spring, and the lower spring is pushed against the lower surface of the material box through the lower spring adjuster;
the motion guide components are configured that: during the release of the film, a sum of a downward elastic force of the upper spring, a gravity of the material box and a gravity of the printed object is less than a sum of an upward elastic force of the lower spring and an upward force of the printing mechanism, and after the material box follows the printing mechanism for the certain distance, the sum of the downward elastic force of the upper spring, the gravity of the material box and the gravity of the printed object becomes greater than the sum of the upward elastic force of the lower spring and the upward force of the printing mechanism.

2. The 3D printing device according to claim 1, wherein the guide rod and above the upper spring adjuster are further provided with a projecting stop structure therebetween.

3. The 3D printing device according to claim 1, further comprising an adjusting rod and an adjusting spring, wherein an upper surface of the base is provided with a plurality of support pillars, and the adjusting rod and the adjusting spring are located between the material box foundation and the support pillars, and the material box foundation is detachably fixed on the support pillars through the adjusting rod; and the adjusting spring wraps around the adjusting rod, and the two ends of the adjusting spring contact against an upper surface of the support pillar and a lower surface of the material box foundation respectively.

4. The 3D printing device according to claim 3, wherein a top surface of the support pillar and a bottom of the material box foundation are each provided with an adjusting hole mating with the adjusting rod, the adjusting hole of the material box foundation is a through hole, an internal surface of the adjusting hole on the top surface of the support pillar is provided with a thread, and the adjusting rod is fixed in the adjusting hole of the support pillar after passing through the through hole.

5. The 3D printing device according to claim 1, wherein the motion guide component is a pneumatic component, a hydraulic component, or an electric component.

6. The 3D printing device according to claim 1, further comprising an adjusting rod and an adjusting spring, wherein an upper surface of the base is provided with a plurality of support pillars, and the material box foundation is detachably fixed on the support pillars through the adjusting rod; and the adjusting spring wraps around the adjusting rod, and the two ends of the adjusting spring contact against an upper surface of the support pillar and a lower surface of the material box foundation respectively.

7. The 3D printing device according to claim 6, wherein a top surface of the support pillar and a bottom of the material box foundation are each provided with an adjusting hole mating with the adjusting rod, the adjusting hole of the material box foundation is a through hole, an internal surface of the adjusting hole on the top surface of the support pillar is provided with a thread, and the adjusting rod is fixed in the adjusting hole of the support pillar after passing through the through hole.

8. The 3D printing device according to claim 2, further comprising an adjusting rod and an adjusting spring, wherein an upper surface of the base is provided with a plurality of support pillars, and the material box foundation is detachably fixed on the support pillars through the adjusting rod; and the adjusting spring wraps around the adjusting rod, and the two ends of the adjusting spring contact against an upper surface of the support pillar and a lower surface of the material box foundation respectively.

\* \* \* \* \*